United States Patent
Braun

(10) Patent No.: US 7,823,273 B2
(45) Date of Patent: Nov. 2, 2010

(54) APPARATUS FOR PROCESSING WORKPIECES CONTAINING PLASTICS MATERIAL

(75) Inventor: Hans-Dieter Braun, Frittlingen (DE)

(73) Assignee: Mschinenfabrik Spaichingen GmbH, Spaichingen (DE)

( * ) Notice: Subject to any disclaimer, the term of this patent is extended or adjusted under 35 U.S.C. 154(b) by 1144 days.

(21) Appl. No.: 11/355,695

(22) Filed: Feb. 16, 2006

(65) Prior Publication Data

US 2007/0011868 A1     Jan. 18, 2007

(30) Foreign Application Priority Data

Feb. 22, 2005   (DE) ....................... 10 2005 009 096

(51) Int. Cl.
   *B23Q 3/00*   (2006.01)
   *B23Q 7/00*   (2006.01)
(52) U.S. Cl. .............................. 29/822; 29/466; 29/559; 269/17; 269/291; 280/47.35
(58) Field of Classification Search .............. 29/407.09, 29/407.1, 465, 466, 559, 799, 824, 281.4, 29/281.1, 822; 414/396; 269/17, 71, 291; 280/47.35, 79.3
See application file for complete search history.

(56) References Cited

U.S. PATENT DOCUMENTS

2002/0017744 A1    2/2002   Lochner et al.

2002/0100534 A1    8/2002   Distel

FOREIGN PATENT DOCUMENTS

| DE | 34 13 255   | 10/1985 |
| DE | 197 41 671  | 7/1998  |
| DE | 198 11 973  | 9/1999  |
| DE | 199 10 028  | 11/2000 |
| DE | 100 38 158  | 2/2002  |
| DE | 100 46 451  | 3/2002  |
| DE | 100 64 523  | 7/2002  |
| DE | 103 13 792  | 10/2004 |
| EP | 0 496 995   | 8/1992  |
| FR | 2 841 662   | 1/2004  |
| WO | 99/43462    | 9/1999  |

*Primary Examiner*—Jermie E Cozart
(74) *Attorney, Agent, or Firm*—Michael J. Striker

(57) ABSTRACT

An apparatus for processing workpieces containing plastics material by welding, stamping, cutting and/or bonding is described. The apparatus includes a loading and unloading station for loading and unloading the workpieces (35), a processing station with a free space for processing the workpieces (35) and at least one interchangeable module (15) which can be inserted and fixed in the free space and which comprises at least one workpiece receptacle (34) and at least one processing tool (37) which are both adapted to a selected processing task. In accordance with the invention the interchangeable module (15) is supported on running wheels (17) and can be inserted in the free space therewith, and the relative position between the receptacle (34) and the processing tool (37) required in the processing is determined by the interchangeable module (15) alone.

23 Claims, 5 Drawing Sheets

APPARATUS FOR PROCESSING WORKPIECES CONTAINING PLASTICS MATERIAL

FIELD OF THE INVENTION

This invention relates to an apparatus for processing workpieces containing plastics material by welding, stamping, cutting and/or bonding, comprising: a basic frame with a loading and unloading station for loading and unloading the workpieces and a processing station with a free space for processing the workpieces and at least one interchangeable module which can be inserted and fixed therein and which is adapted for a selected processing task, provided for this with at least one workpiece receptacle and at least one processing tool and being so formed that the receptacle can move to and fro between the processing station and the loading and unloading station after its introduction to the free space.

BACKGROUND OF THE INVENTION

Apparatuses of the kind here of interest serve for processing workpieces containing plastics material, especially such as consist wholly or in part of thermoplastic plastics, by welding, stamping, cutting and/or bonding. The processing of the workpieces by the use of such apparatuses mostly takes place in that the workpieces are plasticised by heating. The plasticising can be effected by ultrasound (e.g. DE 100 46 451 A1), by use of hot air (e.g. DE 100 38 158 B4) or by contact with a heating element. Processing tools may for example be sonotrodes, nozzles which deliver heated gas streams, electrical heating elements or the like, wherein all these tools are preferably mounted on feed units and can thus be moved to and fro in the direction of the workpieces, in order to start and end the processing operations.

Processing apparatuses of this kind are complex installations which are used in multifarious ways, e.g. in the automobile industry and there in particular for the manufacture of fenders, door and trunk claddings, instrument panels, consoles or the like from polypropylenes and other thermoplastic plastics.

A particular problems is posed by the retooling of such processing apparatuses when changing the workpieces, since both the workpiece receptacles and the tools which are used, or their positioning have to be changed. Apparatuses of the kind initially specified are therefore known, especially so-called cassette machines, which are provided with interchangeable devices, denoted cassettes or interchangeable modules. These contain the necessary receptacles and tools in a manner adapted to a selected processing task and can be fitted or be exchanged when required for another one comparatively quickly in the processing apparatus involved. It is advantageous if the devices denoted throughout below as interchangeable modules can be assembled and pre-mounted largely outside the processing apparatus, so that only short downtimes are needed for the processing apparatus. It is further advantageous that these apparatuses comprises a processing station and a loading and unloading station removed therefrom, in which the workpieces can be loaded in the receptacles and unloaded therefrom without danger to the operator. The receptacle can to this end be moved automatically to and fro between the loading and unloading station and the processing station. However the previously known processing apparatuses of the kind initially specified are characterized by two features found to be disadvantageous.

One feature lies in that the interchangeable module has to be brought to the processing apparatus by means of auxiliary means in the form of a crane, a workpiece truck or the like and then introduced into the processing machine, if required with the use of a reversing device rotatable through 180°.

The use of such auxiliary means involves awkward manipulations when loading, fixing, unloading or the like.

Another feature, likewise not inconsiderable, lies in that the interchangeable module is composed of two elements separable from one another. One of these elements, which mostly forms the bottom of the interchangeable module and carries the workpiece receptacle, is mounted on a slide table of the apparatus movable to and fro between the processing station and the loading and unloading station. On the other hand, the other element forming the remaining part of the interchangeable module and carrying the tools, their feed units and other components is mounted on a so-called bridge of the apparatus, by means of which it is moved to and fro perpendicular to the receptacle, in order to provide enough space between the latter and the workpieces for loading the workpieces, especially when bulky or strongly curved workpieces are involved. On account of this construction it is on the one hand necessary, if needed apart from the tools, to move also a larger, heavy frame section of the interchangeable module, e.g. up to 500 kg, which requires correspondingly designed frame parts and drive units. On the other hand the two elements have to be positioned accurately after their transfer into the processing station and be brought into a predetermined position relative to one another, for which numerous positioning and fixing means are needed. This requires measures which appreciably increase the overall changeover time.

In addition, numerous apparatuses of the kind initially specified are known in which a basic processing unit can be associated in modular manner with a plurality of additional processing units or feed units for additional components, in order to perform several processing steps on the workpieces one after the other or to combine the workpieces with selected components. The additional processing and feed units can also be made mobile and be provided with means for coupling them to a basic processing station in correct position (e.g. DE 103 13 792 A1, DE 197 41 671 A1, DE 199 10 028 A1 or DE 34 13 255 A1). However the problem described above is not solved in any of these devices, viz. on the one hand loading and unloading the workpieces, e.g. manually, in a loading/unloading station removed from the processing station, on the other hand enabling accurate positioning of the workpieces in a processing station, which is arranged in an interchangeable module, without complicated manipulations and adjustments.

Developing from this, the object of the present invention lies in so forming the apparatus of the kind initially specified that no additional auxiliary means such as cranes, trucks or the like are needed for the changeover operation, that small changeover times and thus downtimes of the processing apparatus can be realised and that no positioning, adjusting and fixing measures requiring expensive, complicated manipulations need to be carried out.

SUMMARY OF THE INVENTION

Starting from the above, an object of this invention is to design the apparatus mentioned above such that no particular means as e.g. cranes, carriages or the like are necessary for the process of changing the modules.

A further object of this invention is to make possible short time intervals for changing the modules and to obtain in this manner short periods of disuse of the apparatus.

Yet another object is to so design the apparatus mentioned above that no elaborate and time consuming manipulations are necessary for positioning, adjusting and locking steps.

For the solution of these and other objects the apparatus of the invention is characterized in that the interchangeable module (15) comprises a frame (16) supported on running wheels (17) and receiving the receptacle (34) and the processing tool (37) together and with which it can be moved into and moved out of the free space (2), and in that the relative position of the receptacle (34) and the processing tool (37) is determined in the processing station by their mounting in the frame (16) of the interchangeable module (15).

The invention is further characterized by a module designed in this manner.

On the one hand the invention provides to make the interchangeable module as a whole mobile and such that it can be moved up to and into the basic frame manually and without additional auxiliary means. On the other hand, the interchangeable module according to the invention is so arranged that it itself and not the basic frame determines the position of the workpieces and tools relative to one another in the processing operation. This applies regardless of whether it needs to be possible to move the processing tools with a comparatively large stroke relative to the workpieces. Accordingly the interchangeable module can be made in one piece and apart from a slide table movable between the interchangeable module and a loading and unloading station for the workpieces be mounted fixedly in a basic frame of the apparatus. After positioning and locking the interchangeable module in this basic frame there are no further measures needed to align the tools accurately with the workpieces for example, so that each changeover operation can be performed simply and rapidly. The apparatus as a whole can moreover be made simpler and thus also more cost-effective than hitherto.

BRIEF DESCRIPTION OF THE DRAWINGS

Further advantageous features of the invention appear from the dependent claims.

The invention will now be explained in more detail in conjunction with the accompanying drawing of an embodiment considered to be the best one up to now, wherein.

DETAILED DESCRIPTION OF A PREFERRED EMBODIMENT

Figure 1:
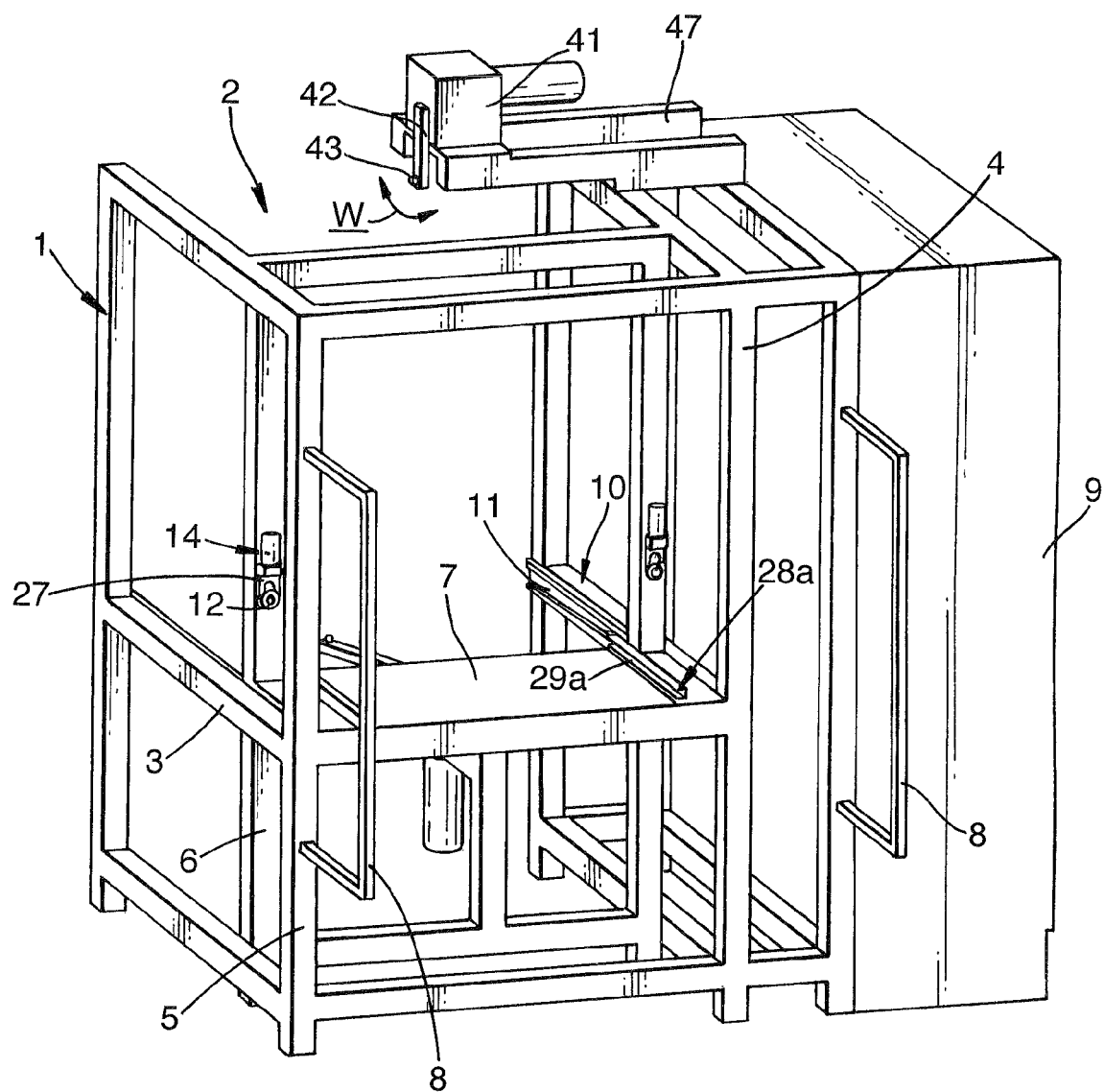
FIG. 1 is a schematic and perspective front view of a processing apparatus according to the invention, without an installed interchangeable module.
Figure 2:
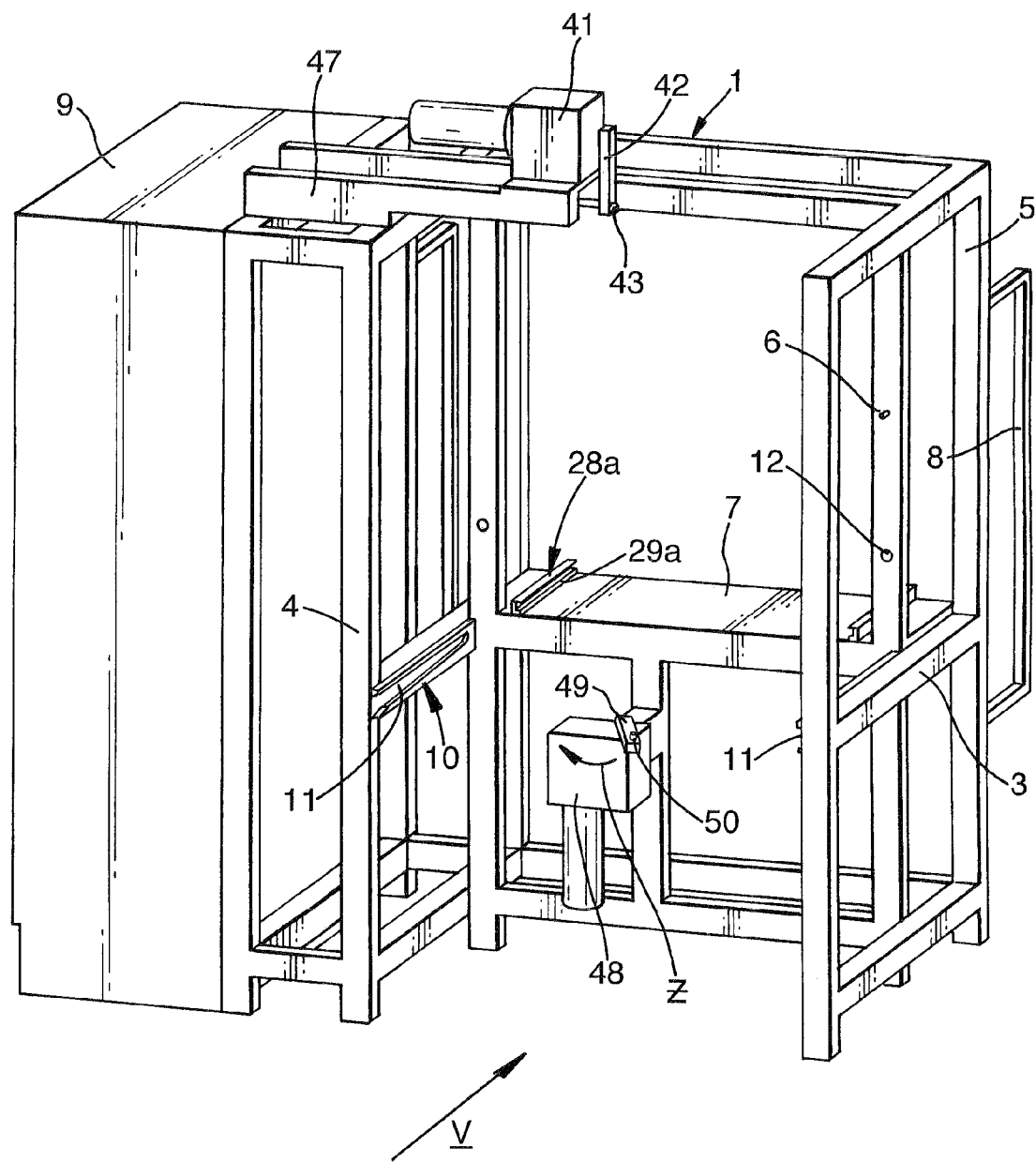
FIG. 2 is a schematic and perspective rear view of the processing apparatus according to FIG. 1.

According to FIGS. 1 and 2, a processing apparatus according to the invention includes a basic frame, denoted generally by the reference numeral 1, supported on the ground. The basic frame 1 is substantially U-shaped as seen from above, whereby a free space 2 results at its rear side, bounded at the sides by two spaced frame parts 3 and 4 of the basic frame 1. The free space 2 is bounded at the front by two frame parts 5 and 6 of the basic frame 1, arranged transverse to the frame parts 3, 4 and likewise spaced apart and which are fixedly connected to one another inter alia by a base plate 7 also arranged transverse to the frame parts 3, 4 and as a rule horizontally arranged in use, or otherwise, so that a machine frame which is overall resistant to bending results, with a substantially U-shaped cross-section.

The front frame section comprising the base plate 7 forms a loading and unloading station for workpieces to be processed and is provided for this with the necessary openings. Normal safety provisions can be provided at the front side of the processing station to protect the operator, in that for example a means 8 for creating a light barrier, a roller door of the like are arranged there. A control cabinet 9 also preferably adjoins one of the lateral frame parts, here the frame part 4. All control means and other components which are needed for performing the processing tasks which can be implemented by the particular apparatus type are advantageously fitted in this box.

According to FIG. 2, two first guides 10 are fixed at the rear side of the basic frame 1. These are for example fixed on the insides of the frame parts 3 and 4 and are substantially horizontal in the state of use of the basic frame 1. The guides 10 consist for example of rails with guide grooves 11 which are open to the free space 2. Finally two through positioning holes 12 are provided in the frame part 6 arranged transversely, facing the free space 2, with which are associated first locking means 14 on the front side of the frame part 6 in accordance with FIG. 1.

Figure 3:
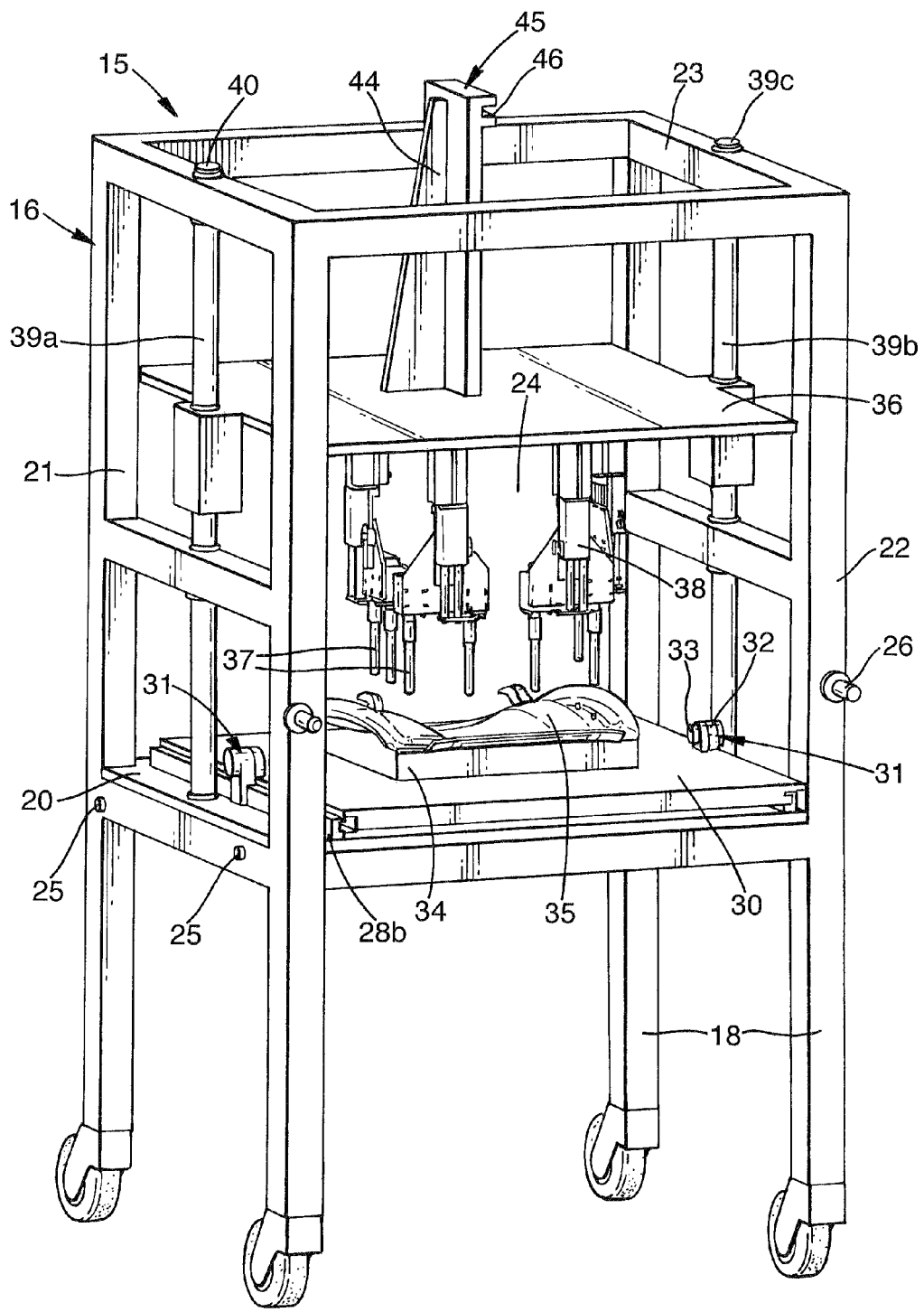
FIG. 3 is a schematic and perspective front view of an interchangeable module according to the invention of the processing apparatus.

FIG. 3 shows an interchangeable module 15 of the processing apparatus according to the invention according to FIGS. 1 and 2. This includes a frame 16 which is supported on legs 18 provided with running wheels 17 and is thus moveable as a whole on the ground. The outer dimensions of the interchangeable module 15 are so selected that it can also as a whole be moved into and out of the free space 2 of the processing apparatus, as FIG. 5 for example shows. The frame 16 includes a bottom part of frame form or as a plate 20 provided with an opening 19, two side frame parts 21 and 22 and a roof part 23 of frame form, which are connected together in a solid unit resistant to bending and bound a processing space 24 (FIG. 3). The opening 19 extends up to the front side of the bottom part 20.

First, outwardly projecting guide elements 25 associated with the first guides 10 (FIG. 2) are fitted on the two side frame parts 21 and 22 of the interchangeable module 15, consisting for example of rollers fitting in the guide grooves 11 and mounted rotatably on the frame parts 21, 22. The arrangement is such that the guide elements 25 enter the guide grooves 11 when the interchangeable module 15 is moved into the free space 2. The interchangeable module 15 is thereby automatically brought into the correct position relative to the basic frame 1.

According to an especially preferred embodiment of the invention, the first guides 10 or lower bounding walls of the guide grooves 11 are somewhat inclined, as is indicated in FIG. 2, specifically rising from the front to the back. The inclined rise is so selected that the interchangeable module 15 is lifted slightly on moving into the free space 2 in the direction of an arrow v (FIG. 2), i.e. the running wheels 17 are raised from the floor by some millimetres for example. This ensures that the relative height position of the interchangeable module 15 in the free space 2 cannot be affected by unevenness of the floor, or the like.

Figure 4:
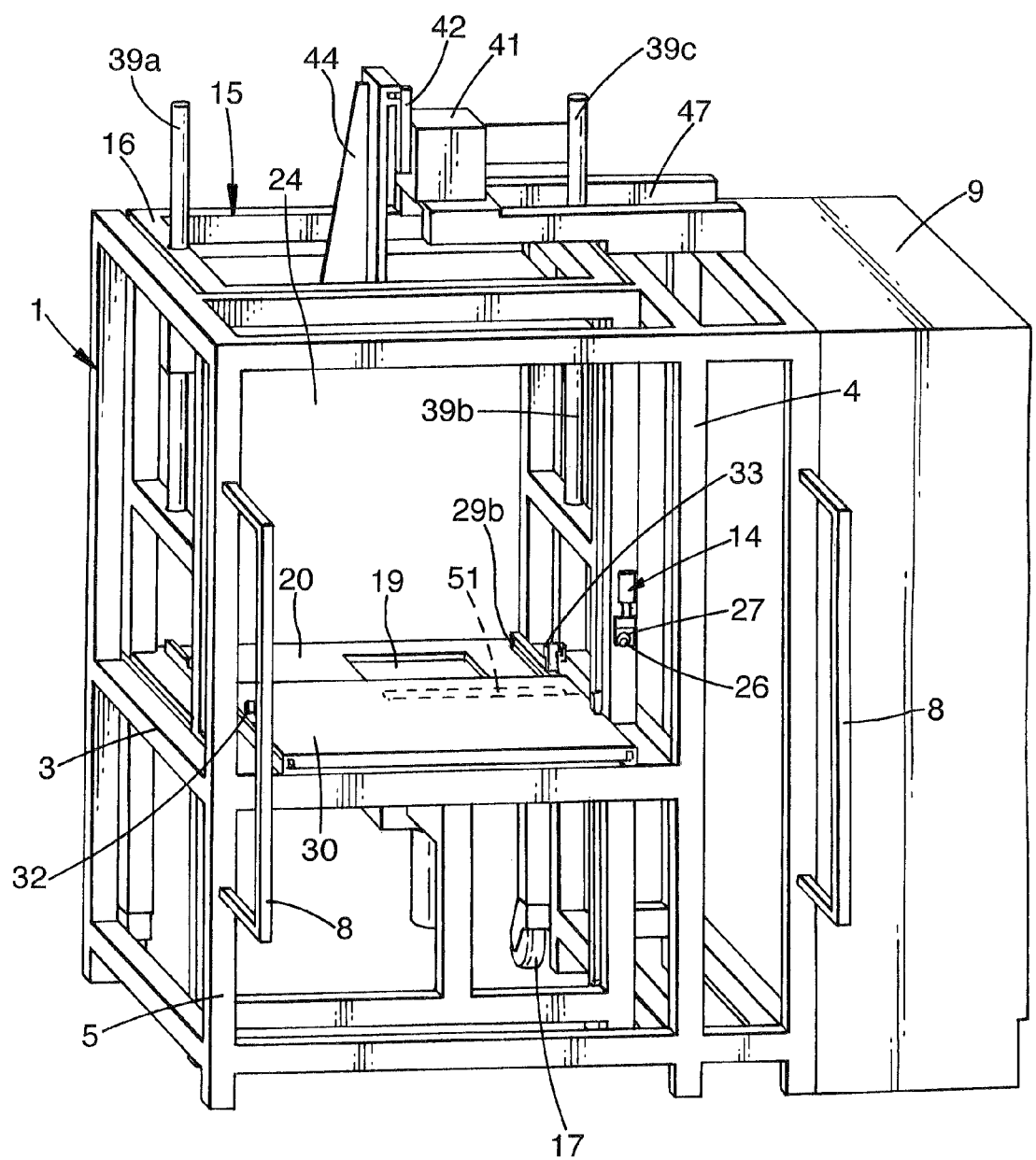
FIGS. 4 and 5 are views corresponding to FIGS. 1 and 2 of the processing apparatus after installing the interchangeable module according to FIG. 3.
Figure 5:
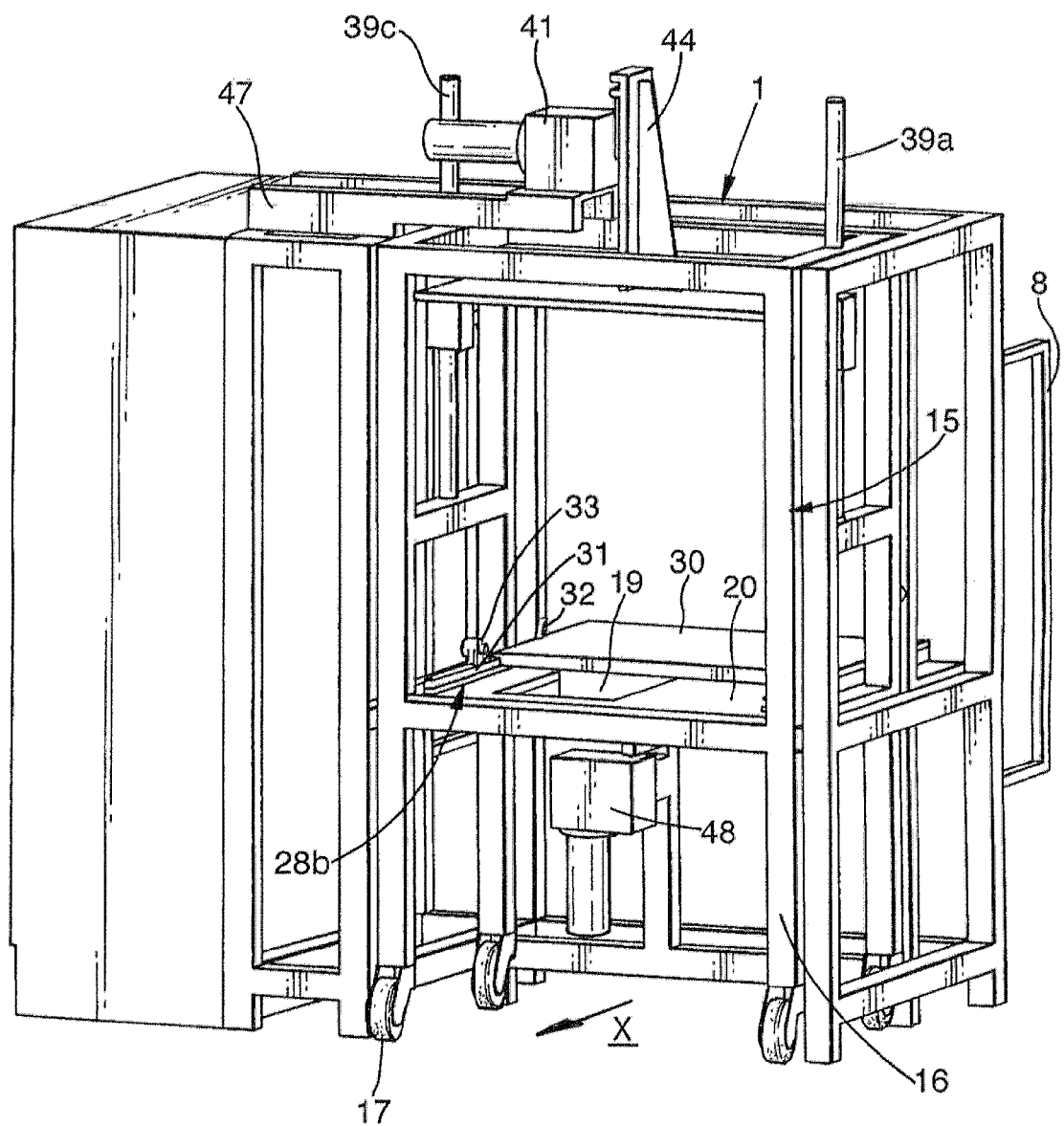

In order to ensure a defined position of the interchangeable module 15 also in the direction of the arrow v (FIG. 2), the interchangeable module 15 is on the one hand pushed up to abutment on the frame part 6 and on the other hand is locked in this position with the aid of the first locking means 14. Forwardly extending locking pins 26 (FIG. 3) on the front side of the interchangeable module 15 on the one hand serve for this, being so arranged and formed that they automatically enter so far into the positioning holes 12 (FIG. 2) in the described insertion of the interchangeable module 15 into the free space 2, that they project beyond these holes with a short section having a peripheral groove. On the other hand the locking means 14 comprise a locking element of forked form closely above each positioning hole 12 and which is slidably mounted on the frame part 6 and can be pushed on to the corresponding locking pin 26 in the manner of a clamping clip and enter into its peripheral groove. The interchangeable module 15 is thus positioned and fixed in all three spatial directions relative to the basic frame 1 (FIGS. 4 and 5). In order that no canting can occur in introducing the locking pins 26 into the positioning holes 12, the front end sections of the guide grooves 11 and the axes of the positioning holes 12 are preferably arranged exactly parallel to one another and horizontal.

A particular advantage of the described features is that the processing apparatus can be operated with any number of interchangeable modules 15 of like form, which are moved into the processing apparatus without auxiliary means and, after the introduction to the free space 2 and after locking the locking means 14, automatically assume a preselected position relative to the basic frame 1.

In accordance with the invention the basic frame 1 and the interchangeable module 15 are also provided with two guides 28a, 28b, which are advantageously arranged parallel to the base plate 7 and to the bottom part 20 and are thus substantially horizontal in operation. The guides 28a, 28b are parallel to one another and are fixed at opposite insides of the side frame parts 3, 4 (guide 28a) and 21 (guide 28b), or alternatively on the baseplate 7 or the bottom part 20. In addition, the two guides 28a, 28b consist for example of rails with U-shaped guide grooves 29a and 29b which are open inwards. Finally, the two guides 28a, 28b are so fitted that, after the introduction of the interchangeable module 15 into the free space 2, they are aligned exactly and adjoin one another directly.

The second guides 28a, 28b serve to receive second guide elements, not shown in detail, which are provided at the sides of a slide table 30 and also advantageously consist of rollers mounted rotatably on the slide table 30 and fitting in the guide grooves 29a, 29b. The slide table 30 is formed according to FIG. 3 as a component of the interchangeable module 15 and can be locked on this with the aid of second locking means 31. The slide table 30 is thus aligned and fixed relative to the interchangeable module 15 in all three spatial directions in the locked position, so that it is also accurately position relative to the basic frame 1 after being insert into this.

Lugs 32 fitted on the slide table 30 for example serve as second locking means, having positioning holes (FIGS. 3 and 4), and locking bolts 33 (FIGS. 3 and 4) fitted on the frame parts 21, 22 or the second guides 28b, which can be inserted into the positioning holes 32 (FIGS. 3 and 4).

On account of the mutual alignment of the second guides 28a, 28b, it is further possible to unlock the slide table 30 by withdrawing the locking bolts 33 from the positioning holes and then slide it forwards into the basic frame 1 or the guides 28a mounted therein, as FIGS. 4 and 5 for example show.

The slide table 30 serves for mounting at least one receptacle 34 (FIG. 3) which effects precise holding of workpieces 35 in the processing operation. The receptacle 34 is shown schematically only in FIG. 3, since its form and size depend on the kind of workpiece 35 which is to be processed in the individual case.

In the embodiment of FIG. 3 a support 36 is provided above the slide table 30, arranged substantially parallel thereto and on which at least one processing tool 37, not shown in detail, e.g. a sonotrode, is suspended. A feed unit 38 in the form of a pneumatic cylinder/piston arrangement or the like is preferably associated with each processing tool 37, in which case the processing tool 37 can be moved to and fro by means of the feed unit 38 relative to the support 36 and thus also relative to the workpiece 35. This movement takes place in the embodiment in the vertical direction, i.e. perpendicular to the surface, horizontal in operation, of the slide table 30. Beyond this, processing tools 37 for the initially described purpose and their feed units 38 are generally known and are not subject matter of the present invention, so that further explanation is not necessary for the man skilled in the art.

According to an embodiment of the invention regarded at present as the best, the support 36 is in the form of a plate parallel to the surface of the slide table 30, its side edges being fixed on columns 39a, 39b arranged perpendicular to this plate. Both columns 39a, 39b are supported in a processing position with their lower ends on the frame 16 (e.g. on the bottom part 20, FIG. 3) and are moreover vertically slidably mounted in the frame 16 in guide bushes 40 indicated only schematically. Accordingly it is possible the raise the support 36 and the tool 37 therewith over a path of about 400 mm for example relative to the workpiece 35. The columns 39a, 39b are preferably made adjustable at their lower ends, so that the height of the support 36 in the processing position can be altered if required.

A first drive unit 41 described below is advantageously provided to move the support 36. According to FIG. 1 this is mounted on the basic frame 1 of the processing apparatus above the free space 2 and is in the form of an electrical geared motor for example whose drive shaft is fixed to one end of an arm 42 whose other end carries a third guide element 43, advantageously in the form of a rotatable roller. The arm 42 can be turned by switching on the drive unit 41 through 360° in the direction of an arrow w about the axis of the drive shaft, which is arranged substantially perpendicular to the direction of introduction of the interchangeable module 15 (arrow v) and parallel to the surface of the slide table 30 or support 36. In a particularly preferred embodiment however a reversible motor is used, in order to turn the arm firstly through 180° in one direction (=upwards stroke) and then in the opposite direction also through 180°

(=downwards stroke) into the starting position. The advantage of this is that the guide groove 45 has only to be half as long.

The support 36 is fixedly connected in the embodiment to a vertically upwardly projecting coupling element 44 (FIG. 3), which has a third guide 45 on an upper end, preferably having a guide groove 46 adapted for coupling to the guide element 43 (FIG. 1). The arrangement is such that the guide element 43 and the third guide 45 form a means for automatic coupling and uncoupling of the support 36 to and from the drive unit 41. To this end the guide groove 46 is on the one hand parallel to the direction v (FIG. 2) in which the interchangeable module 15 is moved on introduction to the free space 2. On the other hand the guide groove 46 is so arranged after moving the first guide elements 25 of the interchangeable module 15 into the first guide 10 of the basic frame 1 and is open to the guide element 43 of the arm 42, that this automatically enters the guide groove 46 on further sliding of the interchangeable module 15 in the direction of the free space 2. A condition for this is merely that the guide element 43 is located at its lowest position apparent in FIG. 1 in which the arm 42 points vertically downwards. If the interchangeable module 15 is finally within the basic frame 1 fully in its position, fixed by the first locking means 14 the guide element 43 is in an end section of the guide groove 46, with the consequence that the coupling element 44 and the whole support 36 therewith can be moved vertically up and down by switching on the first drive unit 41. The drive unit 41 forms a sinusoidal driver. The advantage of this is that the guide element 43 is located after half a revolution of the drive shaft of the drive unit 41 and arm 42 in its highest position or upper dead point. If therefore the drive unit 41 is switched off after half a revolution of the drive shaft, the highest position of the support 36 is automatically held by self locking, without addition locking being necessary. Moreover it is clear that the support 35 returns to its starting position according to FIG. 3 again after a further half revolution of the arm 42 in the opposite direction of rotation.

The described processing apparatus is further provided with a withdrawal safety lock. This prevents the interchangeable module 15 located in the free space 2 being removed from the basic frame 1 as long as the support 36 is located in its raised position according to FIGS. 4 and 5. This would have the undesirable result that the coupling element 44 would be uncoupled from the drive unit 41 or from the guide element 43 and then the support 36, including all processing tools 37 fixed thereon, feed units 38, etc. would fall down un-braked to the bottom position determined by abutment of the columns 39a, 39b on the bottom part 20, which could lead to damage to the said parts.

In accordance with the invention one of the columns, here the column 39b is used for one part as a withdrawal safety lock. This is made of such a length that its upper end 39c (FIG. 3) ends substantially flush with the upper part of the frame 16 in the bottom position of the support 36 but a portion corresponding to the stroke of the support 36 projects up out of the frame 16 in the top position of the support 36 (e.g. FIG. 4). On the other hand a stop 47 is fixed rigidly in this region of the frame upper side, being for example a component of the mounting unit provided for mounting the drive unit 41. This stop 47 so position that it lies with little play directly behind the extended end 39c of the column 39b and thus securely prevents withdrawal of the interchangeable module 15 in the direction of an arrow x (FIG. 5) as long as the end 39c projects above the frame 16.

Finally, the invention also provides for moving the slide table 30 automatically. A second drive unit 48 (FIG. 2) serves for this and is formed substantially as the first drive unit 41. An arm 49 with a fourth guide element 50, preferably formed as rotatable rollers, is fixed for this on the drive shaft of an electric geared motor. The drive unit 48 is so mounted in the basic frame 1 in accordance with FIG. 2 that the arm 49 is arranged substantially parallel to the surface of the baseplate 7, while the guide element 50 projects upwards and on the one hand is arranged closely under the baseplate 7 and on the other hand projects into the free space 2, wherein the arm 49 moreover makes a small angle with the direction of introduction v of the interchangeable module 15 in a base position. The drive unit 48 and the arm 49 are moreover so arranged that, after moving the interchangeable module 15 into the basic frame 1 (FIGS. 4 and 5), they come to lie in the recess 19 in the bottom part 20 or of a corresponding frame part, so that their function is not impeded by the interchangeable module 15.

A fourth guide 51—not shown in detail but indicated schematically in FIG. 4 by a broken line—is provided on the underside of the slide table 30 and like the other described guides includes a guide groove for example, which is here open downwards. The guide 51 extends transverse to the direction of the arrow v and only over part of the width of the slide table 30. It is moreover open to the frame part 21 of the interchangeable module 15 lying further away, i.e. to the side. The arrangement is made such that the guide element 50 lies directly adjacent the open end of the guide groove after moving the interchangeable module 15 fully into the free space 2 and thus, by turning on the drive unit 48 and turning the arm 49 (FIG. 2) through a few degrees into a position parallel to the arrow v, the guide element 50 can be introduced to the guide groove 51 and accordingly be coupled to the slide table 30. A further rotation of the arm 49 through 180° in the direction of an arrow z after releasing the locking means 31 results in the slide table 30 being gradually pushed out of the second guides 28b fixed on the interchangeable module 15 (FIG. 3) into the corresponding guides 28a fixed on the basic frame 1, until the arm 49 has reached its corresponding dead point. In this position of the arm 49 the slide table 30 is disposed substantially above the baseplate 7 (FIG. 4). The second drive unit 41 thus also overall forms a sinusoidal drive unit, as here preferred. As with the drive unit 21 it is advantageous to turn back the arm 49 in a direction opposite to the arrow z when the slide table 30 is to be moved back into the interchangeable module 15, in order to avoid premature uncoupling of the guide element 50 and to manage with a short guide 51.

The described processing apparatus operates essentially as follows:

If a change of workpiece and thus of a tool also is desired, the slide table 30 is moved back into the interchangeable module 15 at present in the processing apparatus and is secured therein by the locking means 31. The drive unit 48 is also uncoupled from the slide table 30 by turning the arm 49 through a few degrees. The arm 42 is further turned to its lower dead point seen in FIG. 1, whereby the interchangeable module 15 is prepared for withdrawal from the processing apparatus.

After following unlocking of the locking means 14 the interchangeable module 15 is moved out of the free space 2 in the direction of the arrow x (FIG. 5) and kept at a suitable place, until it is required again. A new interchangeable module 15 is moreover moved into the free space 2 in the direction of the arrow v and locked there by the locking means 14. The interchangeable module 15 is provided on the one hand with a receptacle 34 mounted on the slide table 30, and adapted to the form of the workpieces to be processed next. On the other hand all such tools 37, feed units 38, etc. as are required for the newly to be processed workpieces 35 are fixed on the support 36. In addition, the receptacle 34 and the tools 37 are so positioned and aligned relative to one another as is necessary for the subsequent processing.

After moving in and locking the new interchangeable module 15 by means of the locking means 31, the second drive unit 48 is actuated, in order to couple it to the slide table 30 in the described manner. The locking means 31 are then unlocked, whereafter the slide table 30 is pushed into the front region of the basic frame 1 by renewed actuation of the drive unit 48. This region, which is seen for example in FIG. 4, represents the loading and unloading station of the processing apparatus. The operator can thus load a workpiece 35 to be processed in the receptacle 34 present on the slide table 30 and clamp it in the usual way. The receptacle 34 itself, the necessary clamping means and any further needed processing means integrated in the receptacle 34 are not shown, since they do not have to be altered from usual known processing apparatuses.

In the next step the slide table 30 is moved back into the interchangeable module 15 by means of the drive unit 48 and arrested there by the locking means 31 (FIG. 3). In this position the new workpiece is automatically so aligned relative to the at least one processing tool 37 that this or the associated feed unit 38 can be activated straightway, without further aligning, adjusting and/or securing measures, in order to advance the tool 37 in the direction of the workpiece 35. The free space 2 and the interchangeable module 15 locked therein, including the processing space 24 and the locked slide table 30 define the processing station of the processing apparatus.

After completing the processing, the tool 37 is raised again, whereafter the locking means 31 are unlocked and the slide table 30 is moved back into the loading and unloading station according to FIG. 4, in order to load a new workpiece 35 into the receptacle 34. If workpieces 35 which are relatively flat are involved, the support 36 or the tool 37 or the feed devices 38 can be mounted rigidly in the frame 16. Any necessary stroke is then realised just by the feed units 38. With bulky or strongly curved workpieces 35, with which the stroke of the feed unit 38 is insufficient to bring the workpiece 35 with the slide table 30 under the processing tool 37 or remove it again, the support 36 together with the tool 37 must be raised additionally, before the workpiece 35 is fed in or removed. In this case at least some of the interchangeable modules 15 which are prepared for such workpieces 35 must be provided additionally with coupling elements 44, should all existing interchangeable modules 15 not actually have this coupling element 44. In accordance with the above description, this coupling element 44 is then automatically coupled to the first drive unit 41 on moving such an interchangeable module 15 into the free space 2. Before moving the slide table 30 into the loading and unloading station, the support 36 together with the tools 37 mounted thereon can then be raised by actuation of the drive unit 41, as far as is necessary, advantageously always to the upper dead point, in order to effect locking by self locking If the new workpiece 35 has then been loaded and the slide table 30 returned to the interchangeable module 15 and locked there, the support 36 is lowered into the low position of the arm 42, whereafter the processing of the workpiece 35 can be effected in the usual way.

Numerous further advantages are obtained through the invention, in addition to the advantages already mentioned. However it is above all advantageous that the workpiece and tool change can be effected without additionally auxiliary means, simply in that a suitable interchangeable module 15 is moved into the processing apparatus and is locked therein by the locking means 14. The whole interchangeable module 15, apart from the slide table 30, can therefore be built in one part in contrast to before. However, above all, the elements determining the geometry such as for example the slide table 30 and the support 36, which ensure precision of the point of contact of the tool 37 on the workpiece 35 are always components of the interchangeable module 15, and not as heretofore of the other parts of the processing apparatus. Moreover the first drive unit 41 needs to raise only the support 36 and the tools 37 when necessary but not the whole interchangeable module 15 or significant parts of the frame 16. A comparatively small, compact, cost-effective construction of the whole processing apparatus is thus possible.

The invention is not limited to the described embodiment, which can be modified in many ways. This applies in particular to the guides, locking means and drive units described only by way of example, which can be designed in other ways as required. In principle the locking means 14, 31 can be manually actuated. However, the locking elements 27 and the locking bolts 33 for example are with particular advantage actuated automatically electrically or with the aid of pneumatic cylinder/piston devices or the like. In addition the electrical and if appropriate the pneumatic supply to the various drive units as well as the control of these parts is preferably effected with the aid of corresponding switches or a suitable sequencing controller from the control cabinet 9, while elements located on the interchangeable module 15 are advantageously connected to the control cabinet 9 by means of simple plug connectors. Furthermore it is clear that the processing apparatus can have at least one interchangeable module 15 suitably prepared for each anticipated processing task. The number of interchangeable modules 15 associated with a processing apparatus can be arbitrarily selected. In addition, it would be possible so the form the processing apparatus differently from FIG. 1, in that the workpieces 35 are processed from below, in which part of the support 36 would be arranged underneath, while the slide table 30 would come to lie above the workpieces 35. The other described components would be adapted in corresponding manner. Finally it is understood that the various features can also be used in combinations other than those described and illustrated.

It will be understood, that each of the elements described above or two or more together, may also find a useful application in other types of construction differing from the types described above.

While the invention has been illustrated and described as embodied in an apparatus for processing workpieces, it is not intended to be limited to the details shown, since various modifications and structural changes may be made without departing in any way from the spirit of the present invention.

Without further analysis, the forgoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. An apparatus for machining workpieces (35) containing plastic material by a process selected from the group consisting of welding, stamping, cutting, adhesive bonding, and a combination thereof, comprising: a basic frame (1) having a machining station with a free space (2) for machining the workpieces (35) and at least one interchangeable module (15) insertable into the free space and fixable therein and adapted to a selected machining task, provided for this purpose with at least one workpiece mount (34) and at least one machining tool (37), wherein the basic frame (1) is provided with a loading and unloading station for loading and unloading the workpieces (35) and the interchangeable module (15) is formed such that the mount (34), after its introduction into the free space (2), is movable to and fro between the machining station and the loading and unloading station, with the interchangeable module (15) comprising a frame (16) supported on running wheels (17) and receiving the mount (34) and the machining tool (37) together and moveable with the mount (34) and the machining tool (37) into and out of the free space (2), with a relative position of the mount (34) and of the machining tool (37) being determined in the machining station by their fastening in a frame (16) of the interchangeable module (15), with the loading and unloading station and the interchangeable module (15) comprising guides (28*a*, 28*b*) which are aligned with one another in a latched state of the interchangeable module (15), and with the mount (34) being provided on a slide table (30) having guide elements cooperating with the guides (28a, 28b), by which the slide table (30) is moveable to and fro between the interchangeable module (15) and the loading and unloading station in an inserted state of the interchangeable module (15).

2. An apparatus according to claim 1, wherein the basic frame (1) comprises first latching means (14) for latching the interchangeable module (15) in the free space (2).

3. An apparatus according to claim 2, wherein the basic frame (1) is provided with guides (10) adjacent to the free space (2) for correct positioning of the interchangeable module (15) in the machining station; and the interchangeable module (15) comprises guide elements (25) attached at a side and associated with the guides (10).

4. An apparatus according to claim 3, wherein the guides (10) have rails provided with guide grooves (11) and the guide elements (25) have rotatable rollers which are introduceable into the guide grooves (11).

5. An apparatus according to claim 3, wherein the guides (10) are formed such that the interchangeable module (15) is raised slightly on moving into the basic frame (1).

6. An apparatus according to claim 1, wherein the free space (2) is provided at a rear side of the basic frame (1).

7. An apparatus according to claim 1, wherein at least the interchangeable module (15) is provided with latching means (31) for the slide table (30).

8. An apparatus according to claim 1, wherein the machining tool (37) is fixed rigidly at the interchangeable module (15).

9. An apparatus according to claim 1, wherein the machining tool (37) is mounted on a feed unit (38) rigidly connected to the interchangeable module (15).

10. An apparatus according to claim 9, wherein one of the elements selected from the group consisting of the machining tool (37) and the feed unit (38) is fastened to a carrier (36) mounted displaceable in the interchangeable module (15).

11. Apparatus according to claim 10, wherein the carrier (36) consists of a plate arranged parallel to the slide table (30) and is movable perpendicular to a plate plane.

12. An apparatus according to claim 11, wherein the carrier (36) is fastened to columns (39a, 39b) mounted displaceably in the interchangeable module (15).

13. An apparatus according to claim 10, wherein the carrier (36) is fastened to a coupling element (44) which is coupled to a first drive (41) mounted on the basic frame (1).

14. An apparatus according to claim 13, wherein the coupling element (44) and the drive (41) are provided with means for automatic coupling and decoupling of the coupling element (44) on moving the interchangeable module (15) in and out respectively.

15. An apparatus according to claim 14, wherein a third guide (45) arranged parallel to a direction of insertion and withdrawal (v, x) is provided at the carrier (36) and a third guide element (43) is provided at the first drive unit (41) and cooperates therewith.

16. An apparatus according to claim 15, wherein the third guide (45) has a third guide groove (46) and the third guide element (43) is a roller which is introduceable into the third guide groove (46).

17. An apparatus according to claim 13, wherein a second drive (48) is mounted on the basic frame (1) and move the slide table (30) which is coupleable to displace the slide table (30) drive-wise in an inserted state of the interchangeable module (15).

18. An apparatus according to claim 17, wherein the slide table (30) is provided with a guide (51) arranged transversely to its direction of displacement and the drive (48) is provided with a guide element (50) cooperating with this guide (51).

19. An apparatus according to claim 18, wherein the guide (51) has a guide groove and the guide element (51) is a roller which is introduceable into the guide groove.

20. An apparatus according to claim 17, wherein the drive (41, 48) is an electric geared motor.

21. An apparatus according to claim 17, wherein the drive (41, 48) is a sinusoidal drive.

22. An apparatus according to claim 1, further comprising a withdrawal safety device preventing inadvertent withdrawal of the interchangeable module (15) from the basic frame (1).

23. An apparatus according to claim 22, wherein the withdrawal safety device includes at least one of two columns (39b) and an abutment (47) cooperating therewith and provided on the basic frame (1).

* * * * *

UNITED STATES PATENT AND TRADEMARK OFFICE
CERTIFICATE OF CORRECTION

PATENT NO. : 7,823,273 B2  Page 1 of 1
APPLICATION NO. : 11/355695
DATED : November 2, 2010
INVENTOR(S) : H-D Braun It is certified that error appears in the above-identified patent and that said Letters Patent is hereby corrected as shown below:

Title Page; Sec. (73) Delete "Mschinenfabrik" and substitute 'Maschinenfabrik'.

Signed and Sealed this
Thirty-first Day of May, 2011

David J. Kappos
*Director of the United States Patent and Trademark Office*